(12) United States Patent
Lim et al.

(10) Patent No.: US 7,009,343 B2
(45) Date of Patent: Mar. 7, 2006

(54) SYSTEM AND METHOD FOR PRODUCING WHITE LIGHT USING LEDS

(76) Inventors: Kevin Len Li Lim, 41 Lorong 31, Taman Lake View 2, 34000 Taiping, Perak (MY); Joon Chok Lee, 210, Pho Kwong Park, 93150, Kuching, Sarawak (MY); Kee Yean Ng, 6 Halsman Kikik, Taman Inderawasih, 13600 Prai Penang (MY)

( * ) Notice: Subject to any disclaimer, the term of this patent is extended or adjusted under 35 U.S.C. 154(b) by 23 days.

(21) Appl. No.: 10/798,010

(22) Filed: Mar. 11, 2004

(65) Prior Publication Data

US 2005/0200295 A1    Sep. 15, 2005

(51) Int. Cl.
H05B 37/02    (2006.01)
(52) U.S. Cl. .................. 315/150; 315/297; 315/307
(58) Field of Classification Search .............. None
See application file for complete search history.

(56) References Cited

U.S. PATENT DOCUMENTS

| | | | |
|---|---|---|---|
| 5,724,062 A * | 3/1998 | Hunter ................. 345/102 |
| 6,265,833 B1 * | 7/2001 | Kim et al. ............ 315/291 |
| 6,411,046 B1 * | 6/2002 | Muthu ................. 315/309 |
| 6,507,159 B1 | 1/2003 | Muthu |
| 6,576,881 B1 * | 6/2003 | Muthu et al. ........ 250/205 |
| 6,637,905 B1 | 10/2003 | Ng et al. |
| 6,682,331 B1 | 1/2004 | Peh et al. |
| 2001/0033488 A1 * | 10/2001 | Chliwnyj et al. .... 362/231 |
| 2002/0047624 A1 * | 4/2002 | Stam et al. .......... 315/291 |
| 2003/0100837 A1 * | 5/2003 | Lys et al. ............ 600/476 |
| 2003/0214242 A1 * | 11/2003 | Berg-johansen ..... 315/169.3 |
| 2003/0230991 A1 | 12/2003 | Muthu et al. |
| 2004/0061814 A1 * | 4/2004 | Kim et al. ........... 349/65 |
| 2004/0076056 A1 | 4/2004 | Schuurmans |
| 2004/0145895 A1 * | 7/2004 | Ouderkirk et al. ... 362/260 |
| 2004/0195975 A1 * | 10/2004 | Fregoso .............. 315/219 |

* cited by examiner

Primary Examiner—Wilson Lee
Assistant Examiner—Marie Antoinette Cabucos

(57) ABSTRACT

A system and method for generating white light involves using a combination of white, red, green, and blue LEDs to produce white light and adjusting the emitted light in response to feedback signals. A light system has a light source that includes at least one white LED and multiple color LEDs and a spectral feedback control system configured to detect light that is output from the light source and to adjust the light that is output from the light source in response to the light detection. The spectral feedback control system may include a color sensor configured to provide color-specific feedback signals, a controller configured to generate color-specific control signals in response to the color-specific feedback signals, and a driver configured to generate color-specific drive signals in response to the color-specific control signals.

20 Claims, 4 Drawing Sheets

SYSTEM AND METHOD FOR PRODUCING WHITE LIGHT USING LEDS

BACKGROUND OF THE INVENTION

Light emitting diodes (LEDs) are typically monochromatic semiconductor light sources, and are currently available in various colors from UV-blue to green, yellow and red. Many lighting applications such as backlighting for liquid crystal display (LCD) panels require white light sources. Two common approaches for producing white light using monochromatic LEDs include (1) packaging individual red, green, and blue LEDs together and combining the light that is emitted from these LEDs to produce white light and (2) introducing fluorescent material into a UV, blue, or green LED so that some of the original light emitted by the semiconductor die of the LED is converted into longer wavelength light and combining the longer wavelength light with the original UV, blue, or green light to produce white light. LEDs produced using the second approach often use phosphor-based fluorescent material and are referred to as phosphor-converted white LEDs.

White light produced by a combination of red, green, and blue LEDs has a wide color gamut but generally has a poor Color Rendering Index (CRI). Although the color gamut of this type of white light source is wide, the light source requires more complex driving circuitry than a phosphor-converted white LED because the red, green, and blue LEDs include semiconductor dies that have different operating voltage requirements. In addition to having different operating voltage requirements, the red, green, and blue LEDs degrade differently over their operating lifetime, which can make color control over an extended period difficult.

Phosphor-converted white LEDs require only a single type of monochromatic LED to produce white light and all of the white LEDs of a multi-LED light source can be driven at the same operating voltage. One shortcoming of phosphor-converted white LEDs is that their spectral power distribution (SPD) is not uniform. This shortcoming results in a relatively poor Color Rendering Index (CRI). In addition, the color generated by phosphor-converted white LEDs tends to vary from its original value over the operating life and with changes in conditions.

What is needed is a white light source that has a high CRI and a wide color gamut that can produce consistent white light over time.

SUMMARY OF THE INVENTION

A system and method for generating white light involves using a combination of white, red, green, and blue LEDs to produce white light and adjusting the emitted light in response to feedback signals. The white LEDs are typically phosphor-converted white LEDs. Generating white light using a combination of phosphor-converted white, red, green, and blue LEDs produces white light with an improved CRI and a wide SPD. Adjusting the emitted light in response to feedback allows luminance and chrominance characteristics of the white light to be controlled as the performance of the LEDs change over time.

A light system in accordance with the invention has a light source that includes at least one white LED and multiple color LEDs and a spectral feedback control system configured to detect light that is output from the light source and to adjust the light that is output from the light source in response to the light detection. The spectral feedback control system may include a color sensor configured to provide color-specific feedback signals, a controller configured to generate color-specific control signals in response to the color-specific feedback signals, and a driver configured to generate color-specific drive signals in response to the color-specific control signals.

A method for operating a light system in accordance with the invention involves providing drive signals to a light source that includes at least one phosphor-converted white LED and multiple color LEDs, detecting light that is generated in response to the drive signals, generating feedback signals in response to the detected light, and adjusting the drive signals that are provided to the light source. Color-specific feedback signals are generated from the detected light. The color-specific feedback signals are used to adjust the drive signals for the color LEDs on a per-color basis to maintain luminance and chrominance characteristics of the detected light.

Other aspects and advantages of the present invention will become apparent from the following detailed description, taken in conjunction with the accompanying drawings, illustrated by way of example of the principles of the invention.

BRIEF DESCRIPTION OF THE DRAWINGS

Throughout the description similar reference numbers may be used to identify similar elements.

DETAILED DESCRIPTION

Figure 1:
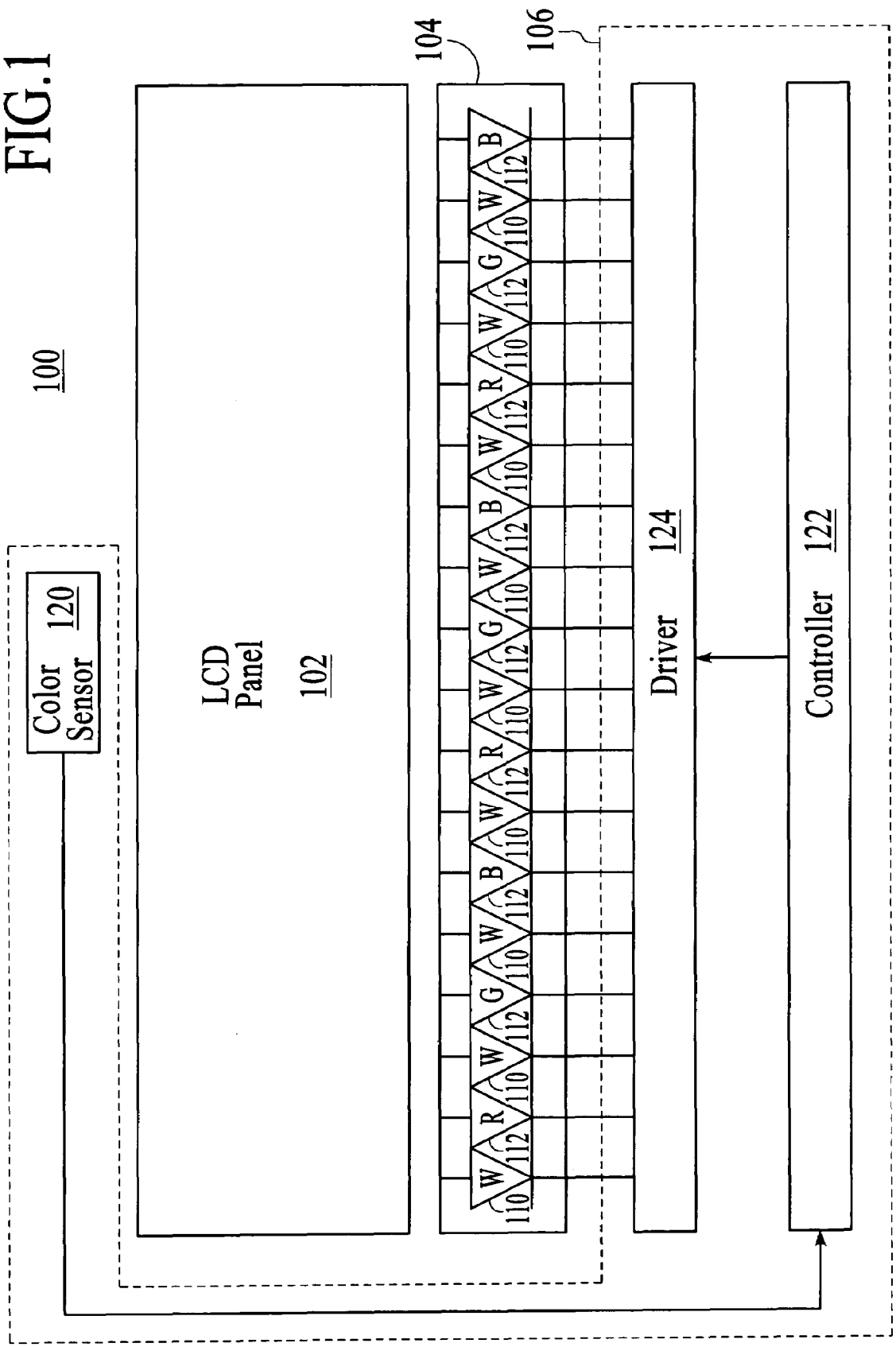
FIG. 1 depicts a light system that is used to backlight a liquid crystal display (LCD) panel in accordance with the invention.

FIG. 1 depicts a light system 100 that is used to backlight a liquid crystal display (LCD) panel. The light system includes an LCD panel 102, a light source 104, and a spectral feedback control system 106. LCD panels are well known in the field of LCD displays. Although an LCD panel is described, other optical media that allows the transmission of light may be used with the light system.

The light source 104 is configured to generate white light in response to applied drive signals. The light source is oriented with respect to the LCD panel 102 such that light is incident on a side surface of the LCD panel as is known in the field of LCDs. Backlighting of LCD panels in general is well known in the field and is not described further herein. The light source depicted in FIG. 1 is made up of multiple light emitting diodes (LEDs), including a mix of LEDs 110 that emit white light (referred to herein as "white LEDs") and LEDs 112 that emit monochromatic light of a particular color (referred to herein as "color LEDs"). In the embodiment of FIG. 1, the white LEDs are phosphor-converted white LEDs. Phosphor-converted white LEDs are well known in the field of LEDs. In one example, phosphor-converted white LEDs combine an LED that emits a blue light with a phosphor such as Cerium activated Yitrium Aluminium Garnet ($Y_3Al_5O_{12}:Ce^{3+}$). The blue LED emits a first radiation typically with a peak wavelength of 460 to 480 nanometers (nm). The phosphor partially absorbs the blue radiation and re-emits a second broadband radiation with a peak wavelength of 560 to 580 nm. The combination of the first and second radiations gives off white light. Although phosphor-converted white LEDs are used for the white LEDs, other LEDs that emit white light may be used in conjunction with the color LEDs to produce white light.

Figure 2:
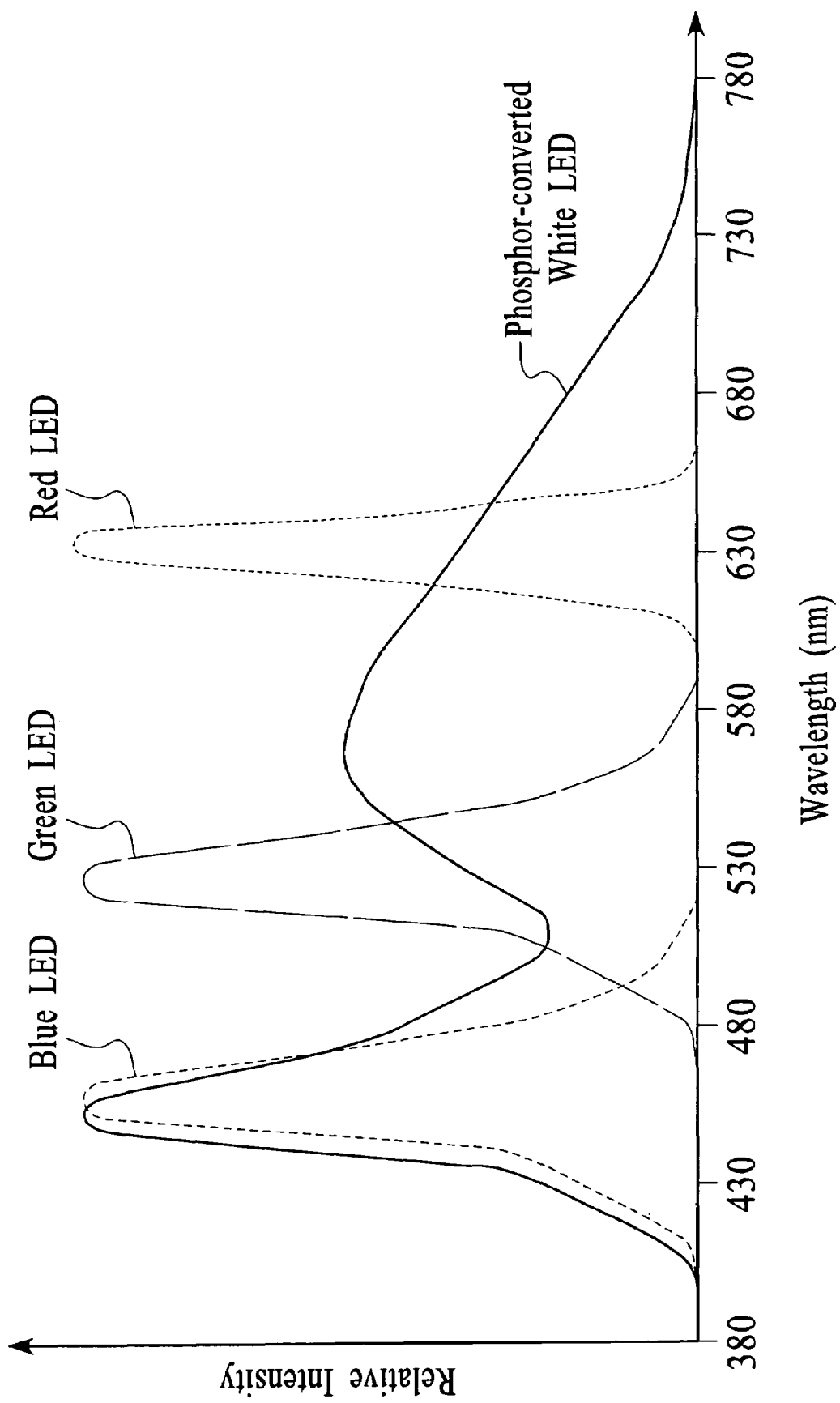
FIG. 2 depicts a graph of the spectral power distribution of a phosphor-converted white LED versus the spectral power distribution of red, green, and blue LEDs.

In the embodiment of FIG. 1, the color LEDs 112 include a mix of red (R), green (G), and blue (B) LEDs that emit monochromatic colored light in the respective red, green, and blue spectrums. Color LEDs are well known in the field of LEDs. Although the color LEDs in the example embodiment of FIG. 1 are red, green, and blue, other color LED combinations can be used. For example, color mixes that include cyan and amber LEDs can be used instead of, or in addition to, red, green, and blue LEDs. The phosphor-converted white LEDs 110 are used in the light source because they are a relatively efficient source of white light. However, phosphor-converted white LEDs have an SPD that is biased towards shorter wavelengths which results in a relatively poor CRI. The red, green, and blue LEDs are added to the light source to both (1) improve the CRI of the white light that is emitted from the light source and (2) to control and maintain the white light. FIG. 2 depicts a graph of the spectral power distribution of a phosphor-converted white LED versus the spectral power distribution of red, green and blue LEDs.

The white LEDs 110 and color LEDs 112 are typically placed along an edge of the LCD panel 102. As depicted in FIG. 1, the white LEDs and color LEDs are distributed in a repeating pattern of white, red, white, green, white, and blue (W R W G W B as shown in FIG. 1). Although a specific pattern of LED distribution is depicted in FIG. 1, other patterns and/or distributions of LEDs can be used. The details of the patterns and/or distributions of LEDs are specific to the application.

Although there is a mix of white LEDs 110 and color LEDs 112 in the light source 104 depicted in FIG. 1, the light source is predominantly made up of white LEDs. The distribution of LEDs throughout the light source in FIG. 1 is one white LED for every one red, green, or blue LED. In another example, a backlight system for a mid-sized LCD panel (e.g., several inches diagonally) may include a distribution of 10 phosphor-converted white LEDs, 2 red LEDs, 4 green LEDs, and 2 blue LEDs.

Returning to FIG. 1, the spectral feedback control system 106 includes a color sensor 120, a controller 122, and a driver 124. The color sensor is oriented with respect to the LCD panel 102 and the light source 104 to detect light that passes through the LCD panel after being emitted from the light source. In the embodiment of FIG. 1, the color sensor is a tri-color sensor that generates color-specific feedback signals that represent color-specific luminance and chrominance characteristics of the detected light. For example, the color sensor provides a set of electrical signals that can be used to represent tristimulus information related to the detected light.

The controller 122 controls the driving of the LEDs 110 and 112 that make up the light source 104. The controller receives color-specific feedback signals from the color sensor 120 and generates color-specific control signals in response to the color-specific feedback signals. The color-specific control signals are generated to produce a desired color from the light source.

Figure 3:
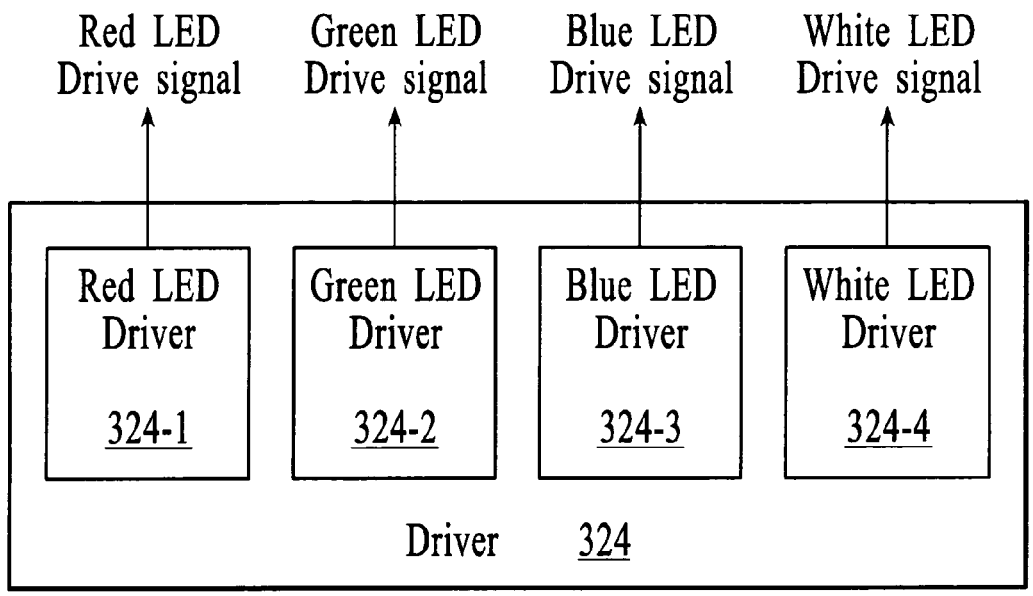
FIG. 3 is an expanded view of the driver from FIG. 1 showing drivers that are specific to the white, red, green, and blue LEDs.

The driver 124 translates the color-specific control signals received from the controller into color-specific drive signals that drive the light source 104. For example, the driver produces color-specific drive signals that control the color LEDs 112 on a per-color basis. That is, the driver can control each color LED (e.g., red, green, and blue) separately. The drive signals generated by the driver may involve voltage and/or current changes being applied to the LEDs. Alternatively, time modulation can be used to control the intensity of the light that is emitted from the LEDs. FIG. 3 depicts an expanded view of the driver from FIG. 1. The driver 324 depicted in FIG. 3 includes color-specific drivers 324-1, 324-1, and 324-3 for the red, green, and blue LEDs, respectively, as well as white LED driver 324-4. The color-specific drivers enable the driver to control the color LEDs on a per-color basis.

In operation, the spectral feedback control system 106 of FIG. 1 measures luminance and chrominance characteristics of the light that is output from the light source 104 and then adjusts the output light to a desired color in response to the measurements. Operation of the system is described in detail with reference to FIG. 1. Starting at the driver 124 for description purposes, the driver provides drive signals to drive the LEDs 110 and 112. For example, the driver produces drive signals that are specific to the white LEDs and color-specific drive signals that are specific to the red, green, and blue LEDs. The LEDs of the light source generate light in response to the drive signals and the light travels through the LCD panel 102. The color sensor 120 detects the light that passes through the LCD panel and generates feedback signals in response to the detection. In the embodiment of FIG. 1, the color sensor outputs color-specific feedback signals related to the red, green, and blue spectrums. The color-specific feedback signals from the color sensor are received by the controller 122 and used to adjust the light source drive signals to produce white light with the desired luminance and chrominance characteristics. To achieve white light with the desired luminance and chrominance characteristics, the controller generates color-specific control signals in response to the color-specific feedback signals from the color sensor. In one embodiment, color-specific control signals are generated by comparing the color-specific feedback signals from the color sensor with reference color information. For example, the color-specific control signals are generated as a function of the difference between the color-specific feedback signals from the color sensor and the reference color information. Example techniques for generating color-specific control signals are described in more detail below.

The color-specific control signals that are generated by the controller 122 are provided to the driver 124. The driver translates the color-specific control signals into color-specific drive signals. The color-specific drive signals are then applied to the color LEDs 112 of the light source 104. In an embodiment, the driver adjusts the drive signals on a per-color basis to produce white light with the desired luminance and chrominance characteristics.

The process of providing drive signals, detecting the resulting light, generating feedback signals, and adjusting the drives signals in response to the feedback signals is a continuous process. Because of the feedback nature of the process, adjustments in the drive signals can be continually made on a per-color basis to maintain the desired luminance and chrominance characteristics of the white light even though the light emitted from the light source 104 may drift. For example, the red, green, and blue LEDs 112 can be adjusted on a per-color basis to provide white light with the desired luminance and chrominance characteristics. In an embodiment, providing the desired white light involves maintaining the desired white light as the light emitted by the individual color LEDs of the light source drifts.

For the purposes of example, the system 100 depicted in FIG. 1 is a three color ("trichromatic") RGB based system. The colored light of a trichromatic system may be described in terms of tristimulus values, based on matching the three colors such that the colors typically cannot be perceived individually. Tristimulus values represent the intensity of three matching lights, in a given trichromatic system, required to match a desired shade. Tristimulus values can be calculated using the following equations:

$$X = k \sum_\lambda W\overline{x}_\lambda R_\lambda$$

$$Y = k \sum_\lambda W\overline{y}_\lambda R_\lambda$$

$$Z = k \sum_\lambda W\overline{z}_\lambda R_\lambda$$

where $W\overline{x}_\lambda = P_\lambda x_\lambda$ $W\overline{y}_\lambda = P_\lambda y_\lambda$ $W\overline{z}_\lambda = P_\lambda z_\lambda$ $k = 100 / \Sigma W y_\lambda$ The relative spectral power distribution, $P_\lambda$, is the spectral power per constant-interval wavelength throughout the spectrum relative to a fixed reference value. The CIE color matching functions, $x_\lambda$, $y_\lambda$, and $Z_\lambda$, are the functions $x(\lambda)$, $y(\lambda)$, and $z(\lambda)$ in the CIE 1931 standard calorimetric system or the functions $x_{10}(\lambda)$, $y_{10}(\lambda)$, and $z_{10}(\lambda)$ in the CIE 1964 supplementary standard calorimetric system. The CIE 1931 standard colorimetric observer is an ideal observer whose color matching properties correspond to the CIE color matching functions between 1° and 4° fields, and the CIE 1964 standard colorimetric observer is an ideal observer whose color matching properties correspond to the CIE color matching functions for field sizes larger than 4°. The reflectance, $R_\lambda$, is the ratio of the radiant flux reflected in a given cone, whose apex is on the surface considered, to that reflected in the same direction by the perfect reflecting diffuser being irradiated. Radiant flux is power emitted, transferred, or received in the form of radiation. The unit of radiant flux is the watt (W). A perfect reflecting diffuser is an ideal isotropic diffuser with a reflectance (or transmittance) equal to unity. The weighting functions, $Wx_\lambda$, $Wy_\lambda$, and $Wz_\lambda$, are the products of relative spectral power distribution, $P_\lambda$, and a particular set of CIE color matching functions, $x_\lambda$, $y_\lambda$, and $z_\lambda$.

Figure 4A:
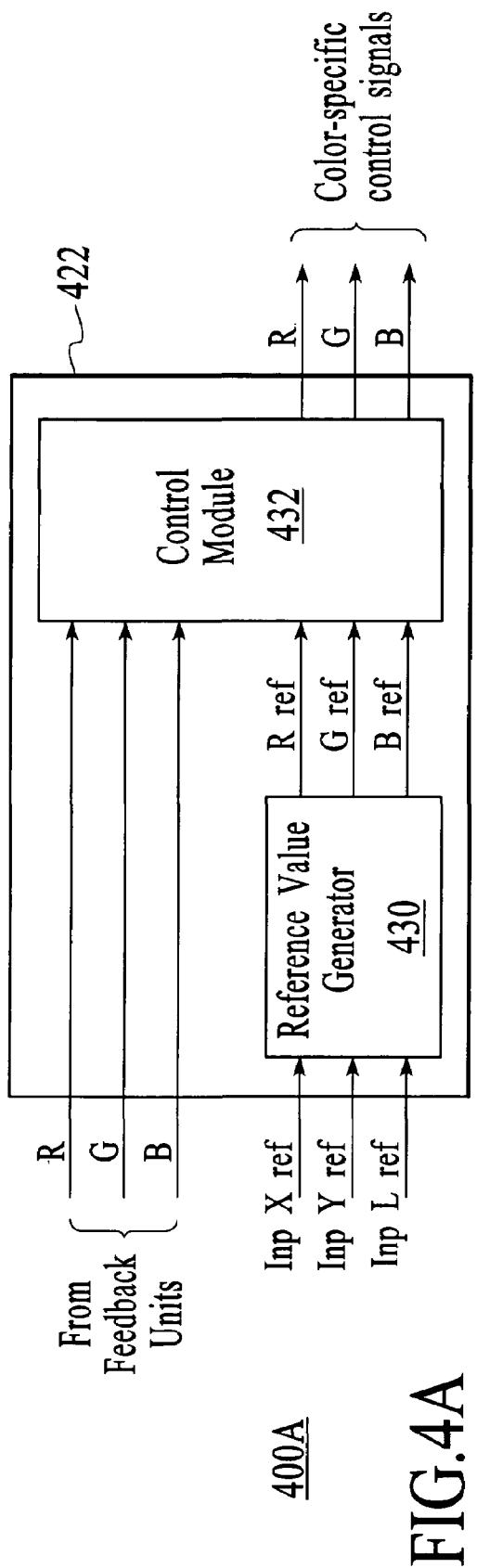
FIG. 4A is an expanded view of the controller from FIG. 1.
Figure 4B:
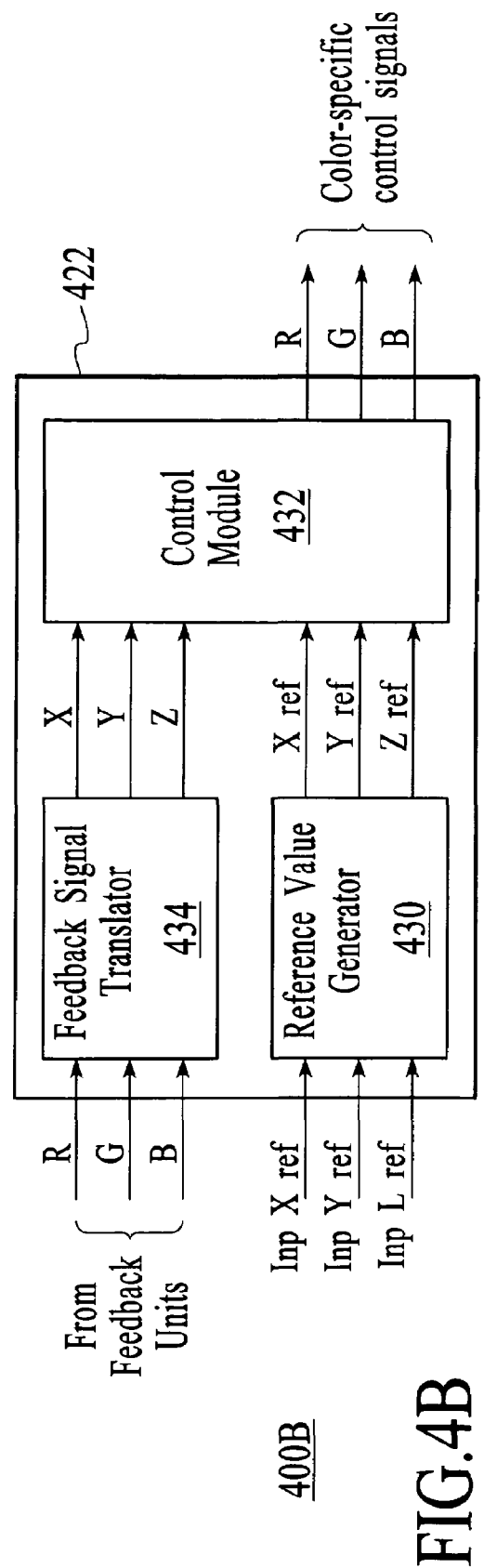
FIG. 4B is an expanded view of another embodiment of the controller from FIG. 1 that uses CIE 1931 tristimulus values.

The controller 122 depicted in FIG. 1 can be implemented in many different ways to achieve color-specific control. FIGS. 4A and 4B depict examples of controllers 422 that can be used to adjust the red, green, and blue LEDs on a per-color basis in the light source depicted in FIG. 1. With reference to FIG. 4A, the controller 422 includes a reference value generator 430 and a control module 432. The controller receives color-specific feedback signals in the form of measured tristimulus values in RGB space (R, G, and B) from the color sensor 120 (FIG. 1). The controller also receives input reference tristimulus values. The input reference tristimulus values may be in the form of a target white color point (X ref and Y ref) and lumen value (L ref). A user may enter the input reference tristimulus values through a user interface (not shown) or the input reference tristimulus values could be received in some other manner. The reference value generator translates the input reference tristimulus values to reference tristimulus values in RGB space (R ref, G ref, and B ref). The control module then determines the difference between the measured tristimulus values and reference tristimulus values and generates color-specific control signals that reflect adjustments that need to be made to the drive signals on a per-color basis to achieve the desired color. The color-specific control signals cause the color LEDs to be adjusted, as necessary, to emit light of the desired color. In this way, the luminance and chrominance characteristics of the light source approaches the desired (i.e., reference) luminance and chrominance characteristics.

The alternate system 400B of FIG. 4B is similar to the system 400A of FIG. 4A except that it uses CIE 1931 tristimulus values. The system 400B includes a feedback signal translator 434 that translates measured tristimulus values in RGB space to measured CIE 1931 tristimulus values. Additionally, the reference value generator 430 converts input reference tristimulus values to reference CIE 1931 tristimulus values. The control module 432 then determines the difference between the measured CIE 1931 tristimulus values and the reference CIE 1931 tristimulus values and adjusts the color-specific control signals accordingly.

Figure 5:
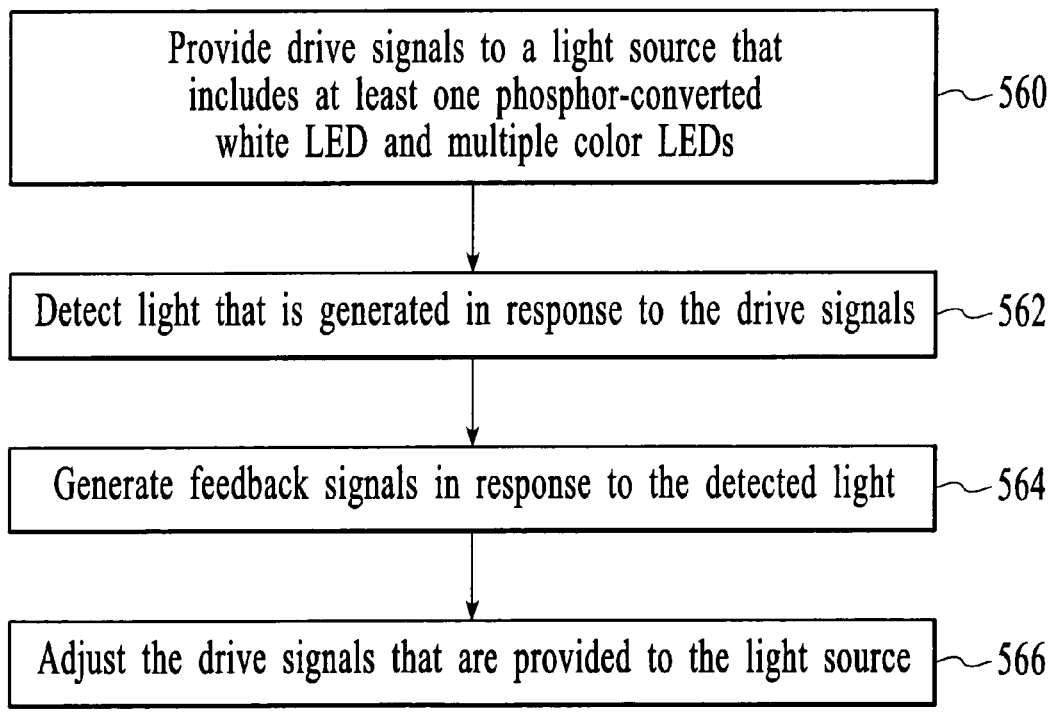
FIG. 5 depicts a process flow diagram of a method for operating a light system in accordance with the invention.

FIG. 5 depicts a process flow diagram of a method for operating a light system in accordance with the invention. At block 560, drive signals are provided to a light source that includes at least one phosphor-converted white LED and multiple color LEDs. At block 562, light that is generated in response to the drive signals is detected. At block 564, feedback signals are generated in response to the detected light. At block 566, the drive signals that are provided to the light source are adjusted.

Although the light system 100 is described as a backlight for an LCD panel, the light system can be used in any other light application and is in no way limited to backlighting for LCD panels.

Other embodiments of the spectral feedback control system 106 that provide feedback signals and adjust the color LEDs on a per-color basis in response to the feedback signals are possible.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A light system comprising:
   a light source that includes at least one white light emitting diode (LED) and multiple color LEDs; and
   a spectral feedback control system configured to drive the light source to output white light, to detect the white light that is output from the light source, and to adjust the white light that is output from the light source in response to the light detection.

2. The light system of claim 1 wherein the spectral feedback control system is configured to control the color LEDs on a per-color basis.

3. The light system of claim 2 wherein the at least one white LED includes at least one phosphor-converted white LED and wherein the color LEDs include red, green, and blue LEDs.

4. The light system of claim 2 wherein the spectral feedback control system further includes a color sensor configured to provide color-specific feedback signals for use in controlling the color LEDs on a per-color basis.

5. The light system of claim 4 wherein the at least one white LED is a phosphor-converted white LED.

6. The light system of claim 1 wherein the spectral feedback control system includes a controller configured to control the color LEDs on a per-color basis to maintain luminance and chrominance characteristics of the white light that is output from the light source.

7. The light system of claim 1 wherein the spectral feedback control system includes a color sensor configured to provide color-specific feedback signals.

8. The light system of claim 7 wherein the spectral feedback control system includes a controller configured to generate color-specific control signals in response to the color-specific feedback signals.

9. The light system of claim 8 wherein the spectral feedback control system includes a driver configured to generate color-specific drive signals in response to the color-specific control signals.

10. The light system of claim 1 wherein the spectral feedback control system includes:
   a color sensor configured to provide color-specific feedback signals;
   a controller configured to generate color-specific control signals in response to the color-specific feedback signals; and
   a driver configured to generate color-specific drive signals in response to the color-specific control signals.

11. A method for operating a light system comprising:
   providing drive signals to a light source that includes at least one phosphor-converted white light emitting diode (LED) and multiple color LEDs to generate white light;
   detecting the white light that is generated in response to the drive signals;
   generating feedback signals in response to the detected light; and
   adjusting the drive signals that are provided to the light source.

12. The method of claim 11 wherein detecting the white light includes generating color-specific feedback signals.

13. The method of claim 12 wherein adjusting the drive signals includes adjusting the drive signals for the color LEDs on a per-color basis in response to the color-specific information.

14. The method of claim 13 wherein the drive signals for the color LEDs are adjusted to maintain luminance and chrominance characteristics of the detected white light.

15. A light system comprising:
   an LCD panel;
   a light source, in optical communication with the LCD panel, which includes at least one phosphor-converted white light emitting diode (LED) and multiple color LEDs; and
   a spectral feedback control system configured to drive the light source to output white light, to detect the white light that is output from the light source, and to adjust the white light that is output from the light source in response to the light detection.

16. The LCD backlight system of claim 15 wherein the spectral feedback control system is configured to control the color LEDs on a per-color basis.

17. The LCD backlight system of claim 16 wherein the color LEDs include red, green, and blue LEDs.

18. The LCD backlight system of claim 16 wherein the spectral feedback control system further includes a color sensor configured to provide color-specific feedback signals for use in controlling the color LEDs on a per-color basis.

19. The LCD backlight system of claim 15 wherein the spectral feedback control system includes a controller configured to control the color LEDs on a per-color basis to maintain luminance and chrominance characteristics of the white light that is output from the light source.

20. The LCD backlight system of claim 15 wherein the spectral feedback control system includes:
   a color sensor configured to provide color-specific feedback signals;
   a controller configured to generate color-specific control signals in response to the color-specific feedback signals; and
   a driver configured to generate color-specific drive signals in response to the color-specific control signals.

* * * * *